Patented Apr. 27, 1937

2,078,237

UNITED STATES PATENT OFFICE 2,078,237

PROCESSES FOR THE PRODUCTION OF ASCORBIC ACID

Otto Dalmer and Hermann Wieters, Darmstadt, Germany, assignors to Merck & Co., Inc., Rahway, N. J., a corporation of New Jersey No Drawing. Application October 17, 1934, Serial No. 748,667. In Germany October 17, 1933

11 Claims. (Cl. 260—123)

This invention relates to improvements in processes for the production of ascorbic acid.

It has been generally assumed that a condition of parallelism exists between the amount of reducing substance contained in vegetal matter and the amount of ascorbic acid contained therein. The work done by the early investigators in this field seems to have been based on this assumption, but it does not appear to have been recognized that the very active reducing substance found in certain vegetable matter may be, in fact, ascorbic acid itself.

Szent-Gyorgyi, (Biochemical Journal, vol. 22, p. 1387, 1928) working with the adrenal cortex of certain animals and also with cabbage leaves and certain other vegetables as starting material, isolated a substance which he referred to as hexuronic acid, since he was unable to describe definitely its exact constitution, and some relationship was believed to exist between this hexuronic acid and the then elusive vitamin C.

Since that time, many different sources for the production of ascorbic acid, also variously known as cevitamic acid, hexuronic acid, and vitamin C, have received the attention of prominent investigators, notably Svirbely and King, (Jr. Biol. Chem., vol. 94, 483, 1931); Baumann and Metzger, (Proc. Soc. Exp. Biol., p. 1268 et seq., 1933); Marine, Baumann and Webster, (Jr. Biol. Chem., vol. 89, p. 213, 1930); King and Waugh, (Science, April 1, 1932, p. 357).

Probably the most recent exhaustive work of finding sources for the practical production of the acid has been done by Baumann and Metzger (Proc. of the Soc. Exp. Biol., p. 1268, et seq., 1933). Their work directed to the isolation of ascorbic acid was based upon the earlier studies by Marine, Baumann and Webster (Jr. Biol. Chem., vol. 89, p. 213, 1930), which indicated that the plants containing the greatest amount of reducing material are cabbage, iris, gladiolus, and sugar maple, as shown by the iodine titration method. Baumann and Metzger, nevertheless, arrived at the conclusion that the leaves of German iris are by far the most satisfactory material from which to extract vitamin C.

Although the earlier titration experiments referred to before showed that gladiolus also contained appreciable quantities of reducing substance, the potential ascorbic acid-yielding properties of the gladiolus were apparently not appreciated.

At any rate, up to the present time, gladiolus was disregarded and German iris (Baumann & Metzger), Hungarian sweet-pepper (Szent-Gyorgyi), and lemon juices (King & Waugh) were preferably selected as suitable and commercially satisfactory sources for the practical production of crystalline ascorbic acid.

We have now found that the juice expressed from gladiola leaves is, in reality, exceptionally rich in ascorbic acid content or the sodium salt of this acid and have succeeded in applying suitably adapted extraction and isolation processes thereto.

However, we have also discovered that the freshly comminuted leaves rapidly deteriorate with respect to their acid content and also that the acid in the form in which it exists in the expressed juices is very unstable. These unfavorable conditions are not nearly so pronounced with respect to the plant sources heretofore practically utilized in the art, which may, in part, also account for the failure of the prior workers to use gladiolus as a source for the practical production of ascorbic acid.

For example, after the elapse of only about an hour after comminution of the gladiola leaves, a material decrease in acid content is observed. The loss of as much as 40% has been noted after so short a time, while the corresponding material obtained from plant sources hitherto used does not so readily lose its effective acid strength and may, in fact, be stored for as long as from 4 to 8 days and even, as with sweet peppers for instance, with beneficial results.

It is, therefore, desirable in order to obtain the best results with the process described herein to use fresh gladiola leaves, and after their comminution promptly to express the juice therefrom.

Gladiola-leaf juices treated according to the described method yield a larger quantity of crude product than the iris leaves, as is evident from the following comparative results obtained on a laboratory scale, using the same methods in both cases:—from 10 kg. iris leaves, 5.2 liters of expressed juice were obtained, which gave a first crystallization of 3.4 grams ascorbic acid; whereas from 10 kg. gladiola leaves, 5.5 liters of juice were obtained which gave an average of 15 grams ascorbic acid in the first crystallization.

Thus we have discovered that the percentage of absolute ascorbic acid inherent in gladiola-leaf juice is much higher than has hitherto been suspected; and, therefore, we have been able to establish that gladiolus is in fact a superior source for the acid production, provided, however, that the acid content is not permitted to be lost through deterioration as elsewhere described.

Furthermore we have also found that the expressed juice of gladiola leaves affords material advantages over the juices heretofore employed. The gladiola juice lends itself to extraction processes whereby the acid is obtained by direct crystallization. In the methods hitherto known, regardless of the starting material, ascorbic acid has been obtained by indirect means. Thus it has been precipitated with metal salts, notably lead acetate, and then regenerated from the lead salt, thus incurring the disadvantages and losses obviously resulting from such indirect production.

Again, Baumann and Metzger (supra), working with iris leaves, were only able to isolate ascorbic acid as acetone ascorbic acid involving, of course, the usual inevitable losses. By our new source and method the ascorbic acid itself may be obtained from gladiola concentrate by direct crystallization, with superior results generally.

In the known processes, as applied to iris, for instance, these indirect methods are necessary due to the fact that the juices contain considerably more resinous impurities than the gladiola-leaf juice, and the ascorbic acid obtained from such other known sources requires different and more intensive solvent treatment for isolation of the pure product. The presence of these impurities, in the form of resinification products, in iris and paprika, for instance, and their substantial absence from gladiola juices probably also accounts for the previously mentioned differences in behavior between the plants with respect to their stability after comminution and prior to expression of the juices therefrom.

The crude product obtained from iris leaves, requires for its purification relatively expensive solvents in large quantities as compared with the crude product from gladiola. Thus, for instance, 30 cc. methanol, 300 cc. acetone, and 300 cc. pentane are required for the purification of 1 gram crude ascorbic acid, according to the process disclosed by Baumann and Metzger (supra) while, according to our exemplified process, using gladiola leaves, approximately only 12 to 20 cc. methanol, 50 to 70 cc. acetone, and 60 to 70 cc. ether are required for purification of a like quantity of crude product.

Of course, the indirect method of forming lead or other metal salts may also be employed with gladiola juice and advantageously modified and appropriately adapted.

Example I 10 liters juice, having a titration value of 75 cc. n/100 (0.01 n) iodine solution per 10 cc. juice, obtained by comminution and immediate pressing of gladiola leaves, are concentrated in vacuo under exclusion of oxygen to about one tenth of its value, after adding 5 cc. 10% potassium cyanide solution, and mixed with the five-fold quantity of methanol under stirring. The precipitated parts are separated; practically the entire quantity of ascorbic acid originally present is contained in the methanol solution. The latter is concentrated to a thin syrup and brought to an acidity of about pH3 by adding 50% sulphuric acid. The thin syrup is then mixed with acetone four times its volume, whereby further unwanted plant substances are precipitated. The acid filtrate is again concentrated to a thin syrup and stirred up with the same volume (about 100 cc.) methanol until completely dissolved. 300 to 400 cc. each of acetone and ether, free from peroxide, are successively added in drops to the methanol solution. The main part of the ascorbic acid is now contained in the mixture of the solvents. In order to obtain further quantities, the brown resinous residue which precipitates from the mixtures of solvents may be repeatedly dissolved in about 100 cc. methanol and treated in the same way with acetone and ether. The combined filtrates are then, finally, in vacuo, concentrated to a thin syrup. In most cases the ascorbic acid crystallizes out already during evaporation. After cooling off and stirring the syrup with a little ethyl alcohol, the greatest part (mostly about 75%) of the ascorbic acid is obtained in crystalline form from the acetone-ethereal solution. The yield of crystalline ascorbic acid is 31 gm., corresponding to about 50% of the reducing substances contained in the starting material. The yield can be increased by working up the other mother liquors.

In the example described above the precipitation with methanol in the first stage of purification may be replaced by a precipitation with other organic solvents miscible with water (cf. the following example). The thin syrup obtained after concentration and acidification may not only, as described, be taken up with methanol but also with other organic solvents in which ascorbic acid is soluble. The whole treatment should be repeated until the ascorbic acid has gained the desired degree of purity.

Example II

The juice (10.25 liters) obtained by treating with steam and pressing out from 10 kg. of gladiola leaves, 10 cc. of which decolorize 25.8 cc. of 1/100 N iodine solution, after addition of 75 cc. of 25% hydrochloric acid is concentrated in vacuo to a thin syrup. The thin syrup is stirred thoroughly with three parts of acetone. The viscous residue is soaked with 80–100 cc. of water and precipitated by adding slowly 800 cc. of acetone. The combined acetone extracts contain about 90% of the reducing substance (ascorbic acid) present in the original juice as a concentrate of about 20%. After distilling off the acetone the residue is taken up in water and the aqueous solution is rinsed twice with ether. About 12 g. of lipoid impurities interfering with further working up are thus removed. Then the aqueous layer is concentrated again in vacuo to a thin syrup and stirred with 30 cc. of methanol, 140 cc. of acetone and 150 cc. of ether. In the mixture of the organic solvents there are contained about 85% of the ascorbic acid present in the original juice as a concentrate of 30–35%. After concentrating there remains a thin syrup from which a copious amount of ascorbic acid crystallizes out within 24–48 hours.

There is obtained a first crystallization of more than 10 g. of ascorbic acid and, after repurification of the mother liquor according to the last described procedure, 3–4 more g. of ascorbic acid, totalling 14 g. or about 65% of the ascorbic acid present in the starting material in a crystalline form. By carefully working up the mother liquors further quantities of ascorbic acid may be obtained.

It is understood, however, that the steps of processes set forth herein may be modified as to precise material and quantities exemplified without departing from the spirit and scope of the invention which is directed, in its predominant feature, to an improved method of producing crystalline ascorbic acid and involving the use of the juices from gladiola leaves as a source.

We claim as our invention:—

1. The process of producing crystalline ascorbic acid comprising the steps of comminuting substantially fresh gladiola leaves, promptly expressing the native juice therefrom and extracting the ascorbic acid from the juice thus obtained.

2. In a process for producing crystalline ascorbic acid, the steps which comprise concentration of the juice obtained by comminution and immediate pressing of fresh gladiola leaves, mixing with an organic water-miscible solvent, separating the precipitate, concentrating the filtrate to a thin syrup, adding a strong acid until an acid reaction of the syrup is reached, mixing the syrup with a solvent capable of dissolving the ascorbic acid out of the syrup, such solvent being a neutral, lower aliphatic, organic-oxygen compound of the group consisting of methanol, ethanol, and acetone and ether; and removing the formed precipitate.

3. A process for producing crystalline ascorbic acid according to claim 2 which comprises the step of adding a small quantity of potassium cyanide solution to the expressed juice of gladiola leaves before further treating.

4. In a process for producing crystalline ascorbic acid, the steps which comprise concentration of the juice obtained by comminution and immediate pressing of fresh gladiola leaves, adding 5 ccm. of a 10% potassium cyanide solution to each 10 liters of juice, mixing with a five-fold quantity of methanol, separating the precipitate, concentrating the methanol solution to a thin syrup, adding sufficient of a strong acid to bring the syrup to approximately pH3, mixing the syrup with acetone, removing the precipitated substances, and concentrating the acid filtrate to a thin syrup.

5. A process for producing crystalline ascorbic acid according to claim 4, which comprises the further steps of stirring the thin syrup in approximately 100 parts methanol, adding 300 to 400 parts each of peroxide-free acetone and ether, in drops, dissolving the resinous precipitate in approximately 100 parts methanol, again treating with acetone and ether, concentrating the combined filtrates to a thin syrup in vacuo, cooling and stirring the syrup with ethyl alcohol, and permitting the ascorbic acid to crystallize out.

6. The process of producing crystalline ascorbic acid, comprising the steps of comminuting gladiola leaves, promptly expressing the native juice therefrom and extracting the ascorbic acid from the juice thus obtained.

7. The process of producing crystalline ascorbic acid comprising the steps of comminuting steam-treated gladiola leaves, promptly expressing the native juice therefrom and extracting the ascorbic acid from the juice thus obtained.

8. In a process for producing crystalline ascorbic acid, the steps which comprise concentration of the juice obtained by comminution and immediate pressing of steam-treated gladiola leaves, mixing with an organic water-miscible solvent, separating the precipitate, concentrating the filtrate to a thin syrup, adding a strong acid until an acid reaction of the syrup is reached, mixing the syrup with a solvent capable of dissolving the ascorbic acid out of the syrup, such solvent being a neutral, lower aliphatic, organic-oxygen compound of the group consisting of methanol, ethanol, and acetone and ether; and removing the formed precipitate.

9. A process for producing crystalline ascorbic acid according to claim 8 which comprises the step of adding a small quantity of potassium cyanide solution to the expressed juice of gladiola leaves before further treating.

10. In a process for producing crystalline ascorbic acid, the steps which comprise concentration of the juice obtained by comminution and immediate pressing of steam-treated gladiola leaves, adding 5 ccm. of a 10% potassium cyanide solution to each 10 liters of juice, mixing with a five-fold quantity of methanol, separating the precipitate, concentrating the methanol solution to a thin syrup, adding sufficient of a strong acid to bring the syrup to approximately pH3, mixing the syrup with acetone, removing the precipitated substances, and concentrating the acid filtrate to a thin syrup.

11. A process for producing crystalline ascorbic acid according to claim 10 which comprises the further steps of stirring the thin syrup in approximately 100 parts methanol, adding 300 to 400 parts each of peroxide-free acetone and ether, in drops, dissolving the resinous precipitate in approximately 100 parts methanol, again treating with acetone and ether, concentrating the combined filtrates to a thin syrup in vacuo, cooling and stirring the syrup with ethyl alcohol, and permitting the ascorbic acid to crystallize out.

OTTO DALMER.
HERMANN WIETERS.